(12) United States Patent
Hsu

(10) Patent No.: US 6,764,248 B1
(45) Date of Patent: Jul. 20, 2004

(54) CONNECTOR FOR A PORTABLE COMBINATION FAN AND MISTER

(76) Inventor: Chin-Tien Hsu, No. 133, Fute 3rd Rd., Hsitzu City, Taipei Hsien (TW)

( * ) Notice: Subject to any disclaimer, the term of this patent is extended or adjusted under 35 U.S.C. 154(b) by 0 days.

(21) Appl. No.: 10/414,127

(22) Filed: Apr. 14, 2003

(51) Int. Cl.⁷ .................................................. F16B 21/00
(52) U.S. Cl. ...................... 403/329; 403/326; 403/315; 417/313; 416/146 R
(58) Field of Search .................. 417/423.15, 313, 417/360; 416/63, 146 R, 247 R; 62/259.4; 454/370, 337, 328; 403/315, 316, 319, 326, 329, 331, 363

(56) References Cited

U.S. PATENT DOCUMENTS 3,935,613 A * 2/1976 Kaneko .......................... 16/30
4,127,911 A * 12/1978 Cupp et al. ................. 15/210.1
4,422,212 A * 12/1983 Sheiman et al. ............... 16/29

FOREIGN PATENT DOCUMENTS

GB        2 224 231    * 5/1990   ................. 403/331

* cited by examiner

Primary Examiner—Anthony Knight
Assistant Examiner—Michael P. Ferguson
(74) Attorney, Agent, or Firm—Dellett & Walters

(57) ABSTRACT

A connector for a portable combination fan and mister in accordance with the present invention has a lock, a hook and a corresponding strongback. The hook is attached to the fan to hold the strongback that is attached to the mister. The connector allows the fan attached to and disconnected from the mister quickly and conveniently.

1 Claim, 6 Drawing Sheets

CONNECTOR FOR A PORTABLE COMBINATION FAN AND MISTER

BACKGROUND OF THE INVENTION

1. Field of the Invention

The present invention relates to a connector, and more particularly to a connector for a portable combination fan and mister.

2. Description of Related Art

With reference to FIGS. 4 and 5, a conventional portable combination fan and mister comprises a fan assembly (60), a connector (70) and a mister (80).

The fan assembly (60) has a front end (not numbered), a rear end (not numbered), a bottom surface (not numbered), a housing (62) and a fan (64). The fan (64) is mounted on the front end of the housing (62). The connector (70) is a U-shaped bracket and has multiple screws (74). The U-shaped bracket comprises a longitudinal strip (76) and two resilient clamps (72). The longitudinal strip (76) has two ends (not numbered) and multiple through holes (not numbered). The resilient clamps (72) are formed respectively on and extend perpendicular from opposite ends of the longitudinal strip (76). The connector (70) is attached to the housing (62) of the fan assembly (60) by passing the screws (74) through the through holes in the strip and screwing the screws (74) into corresponding threaded holes (not numbered) in the housing (62).

The mister (80) stores water, selectively dispenses a mist, detachably attaches to the connector (70) and comprises a reservoir (86) and a nozzle assembly (82). The reservoir (86) is a resilient hollow body and has a front end (not numbered), a rear end (not numbered), a front opening (not numbered), a rear opening (not numbered) and a cap (84). The front and rear openings have threaded protrusions and extend respectively from the front and rear ends of the reservoir (86). The cap (84) screws onto the threaded protrusion on the rear opening in the reservoir (36). The nozzle assembly (82) screws onto the threaded protrusion on the front opening in the reservoir (86).

The mister (80) is attached to the connector (70) by pressing the protrusions on the front and rear openings respectively into the clamps (72) on the bracket. The combination fan and mister is operated by turning on the fan and squeezing the resilient reservoir (86) to dispense a mist. With further reference to FIG. 6, the combination fan and mister blows the mist and air in a desired direction to provide a cooling effect.

However, the connector (70) is attached to the fan assembly (60) with screws so the fan assembly (60) cannot be conveniently separated from the connector (70). In another embodiment (not shown),.the connector (70) is implemented with a hook or loop fastener attached to the mister (80) and a complementary hook or loop fastener attached to the housing (62) of the fan assembly (60). In another embodiment (not shown), a cup-like bracket integrally formed with the reservoir (36) replaces the connector (70). The housing (62) can be inserted into and attached to the cup-like bracket. The two types of connectors (70) quickly attach the mister (80) to the housing (62), but extended use will make the mister (80) and the housing (62) loose.

The present invention has arisen to mitigate and/or obviate the disadvantages of the conventional connector for a portable combination fan and mister.

SUMMARY OF THE INVENTION

The main objective of the present invention is to provide a connector that will conveniently attach and detach the fan assembly and mister in a portable combination fan and mister.

To achieve the objective, a connector for a portable combination fan and mister in accordance with the present invention has a lock, a hook and a corresponding strongback. The hook is attached to the fan to hold the strongback that is attached to the mister. The lock securely holds the strongback in the hook.

Further benefits and advantages of the present invention will become apparent after a careful reading of the detailed description with appropriate reference to the accompanying drawings.

DETAILED DESCRIPTION OF THE INVENTION

Figure 1:
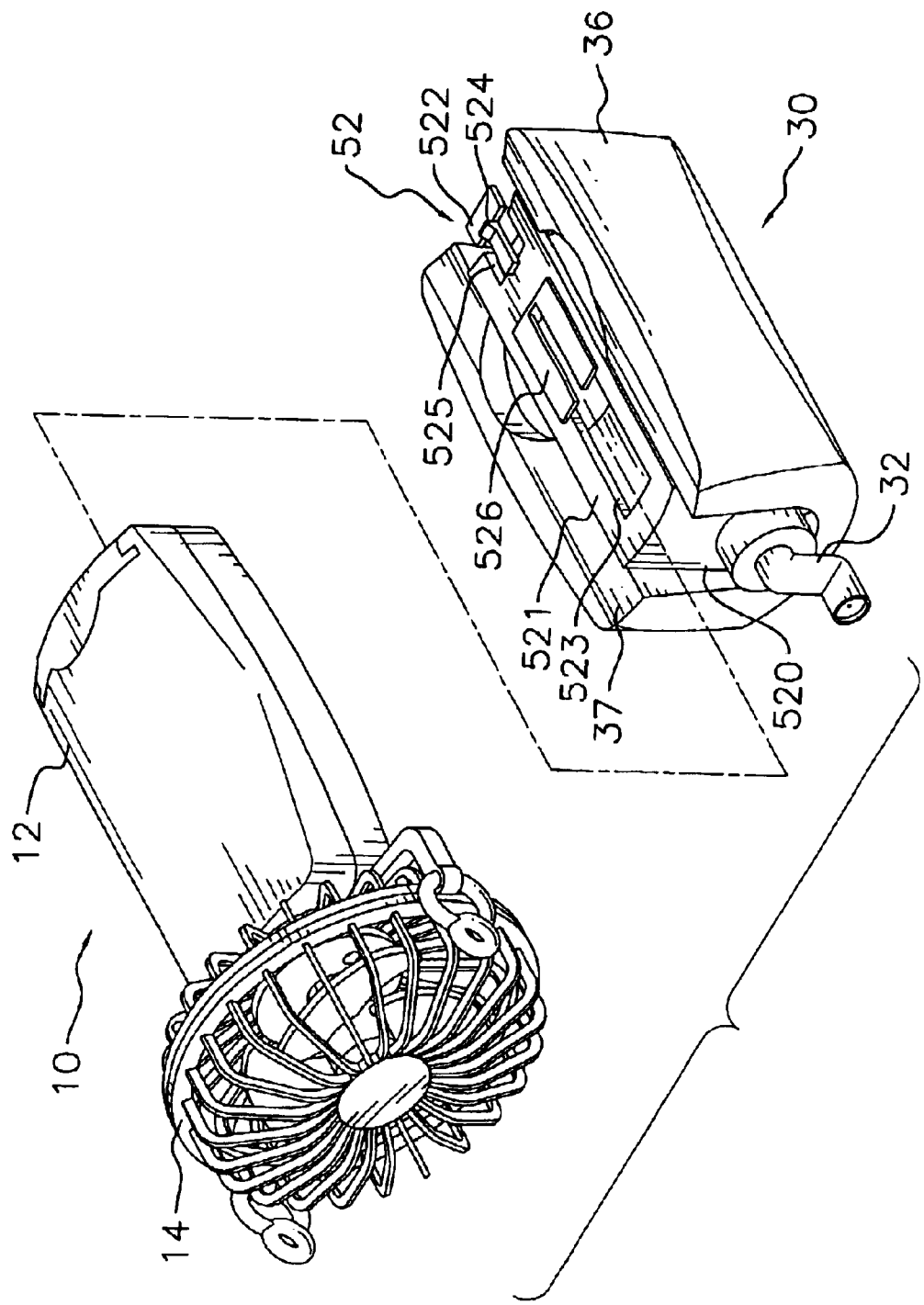
FIG. 1 is an operational perspective view of a portable combination fan and mister with a first embodiment of a connector in accordance with the present invention.
Figure 2:
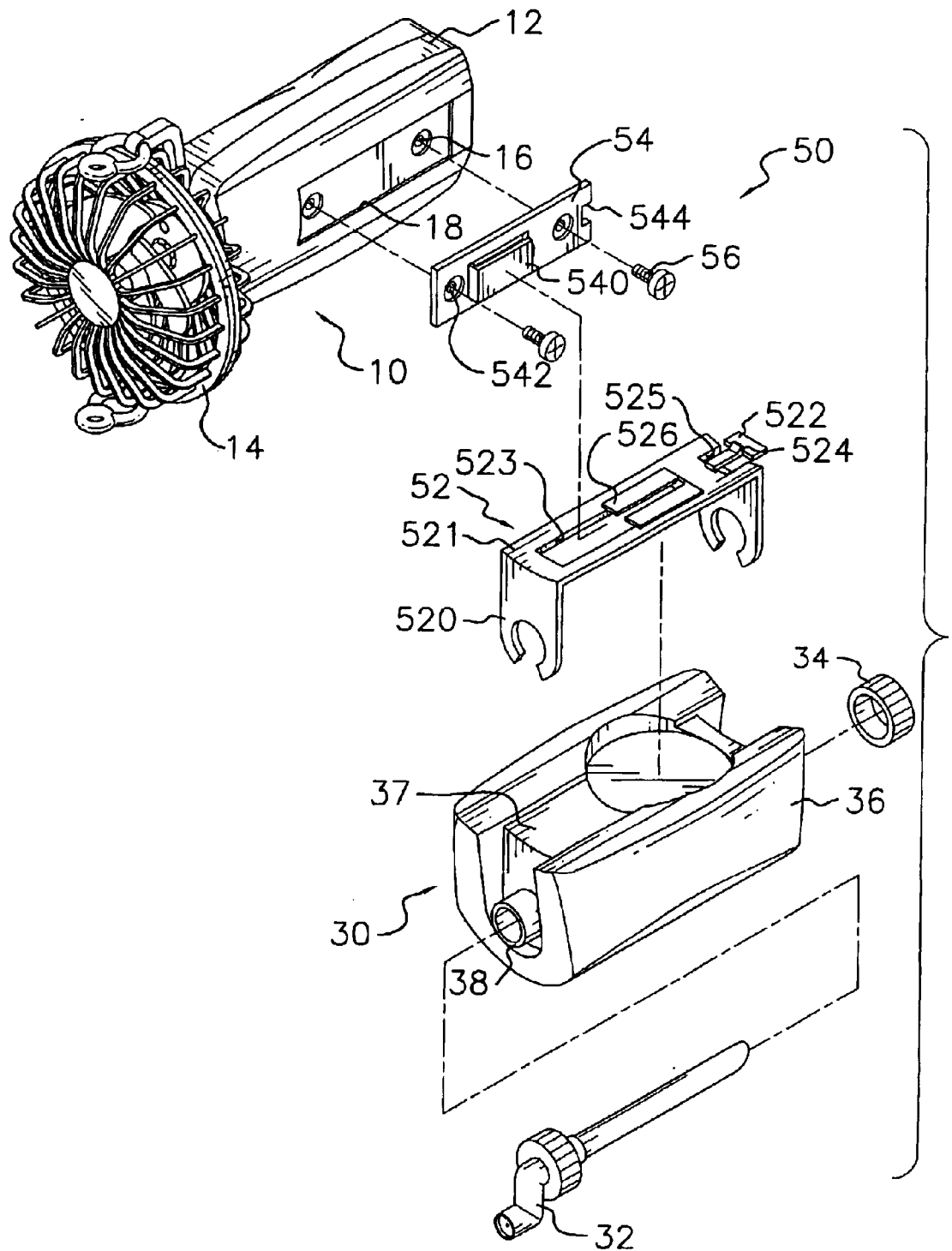
FIG. 2 is an exploded perspective view of the portable combination fan and mister in FIG. 1.

With reference to FIGS. 1 and 2, a connector (50) in accordance with the present invention for a portable combination fan and mister having a fan assembly (10) and a mister (30) comprises a U-shaped bracket (52), a hook bracket (54) and multiple screws (56). The fan assembly (10) has a fan (14) and a housing (12). The housing (12) has a front end (not numbered), a bottom surface (not numbered), a hook-bracket recess (18) and multiple threaded holes (16). The hook-bracket recess (18) is formed in the bottom surface, and the threaded holes (16) are formed in housing (12) in the hook-bracket recess (18). The fan (14) is mounted on the front end of the housing (12). The mister (30) has a reservoir (36), a nozzle assembly (32) and a cap (34). The reservoir (36) has a front end (not numbered), a rear end (not numbered), an abutting surface (37), a nozzle opening (not numbered) and a fill opening (not shown). The nozzle opening has a protruding neck (38), and the fill opening has a protruding neck (not shown). The cap (34) is mounted on the protruding neck (38) of the fill opening, and the nozzle assembly is mounted on the protruding neck (38) of the nozzle opening.

The U-shaped bracket (52) comprises a longitudinal strip (521), two resilient clamps (520), a lock (522) and a strongback (526). The longitudinal strip (521) has a forward end (not numbered), a rear end (not numbered), a longitudinal slot (523) and a notch (525). The longitudinal slot (523) is formed near the forward end, and the notch (525) is formed in the rear end. The resilient clamps (520) are formed respectively on and extend perpendicular from opposite ends of the longitudinal strip (521). The lock (522) is formed in the notch (525), extends past the rear end of the longitudinal strip (521) and has a latch (524). The latch (524) is triangular and protrudes transversely away from the lock (522). The strongback (526) is defined over half of the longitudinal slot (523) in the longitudinal strip (521) toward the rear end. The U-shaped bracket (52) is attached to the mister (30) by pressing the resilient clamps (520) respectively onto the protruding necks (38) extending from the nozzle opening and the fill opening.

The hook bracket (54) comprises a mounting strip (not numbered), a hook (540), multiple through holes (542) and a latch recess (544). The mounting strip corresponds to the hook-bracket recess (18) in the fan assembly (10) housing (12) and has a front end (not numbered) and a rear end (not numbered). The through holes (542) are formed through the mounting strip and correspond to the threaded holes in the hook-bracket recess (18) on the bottom of the fan assembly (10) housing (12). The hook (540) is L-shaped, formed near the front end of the hook bracket (54), extends toward the rear end of the hook bracket (54), is slidably mounted in the longitudinal slot (523) in the longitudinal strip (521) of the U-shaped bracket (52) and engages the strongback (526) of the U-shaped bracket (52). The latch recess (544) is formed in the rear end of the mounting strip and receives the latch (524) on the lock (522) when the strongback (526) is fully seated in the hook (540). The screws (56) respectively extend through the through holes (542) and screw into the threaded holes in the hook-bracket recess (18) on the bottom of the fan assembly (10) housing (12).

Figure 3:
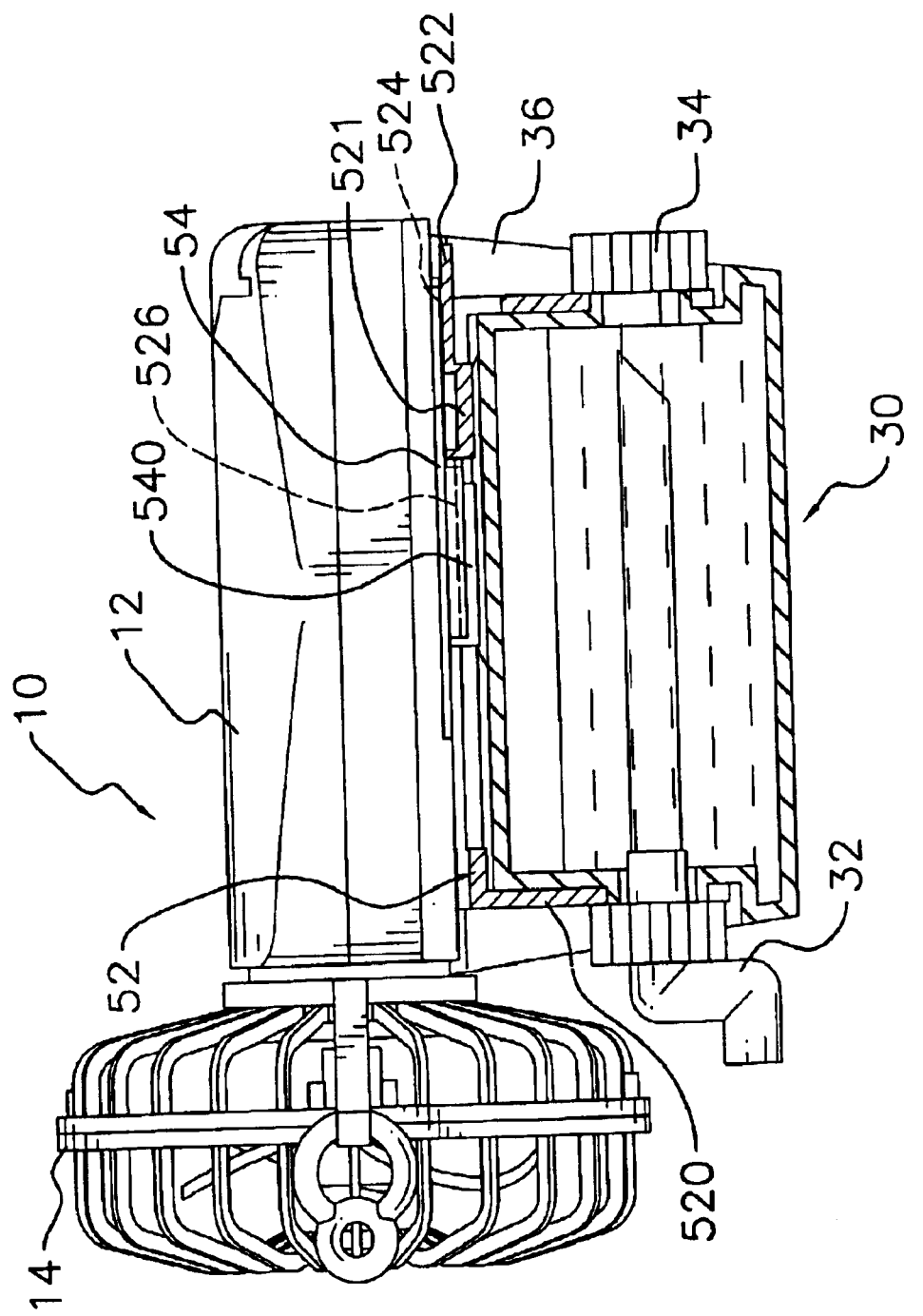
FIG. 3 is a side plan view in partial section of the portable combination fan and mister in FIG. 1.
Figure 4:
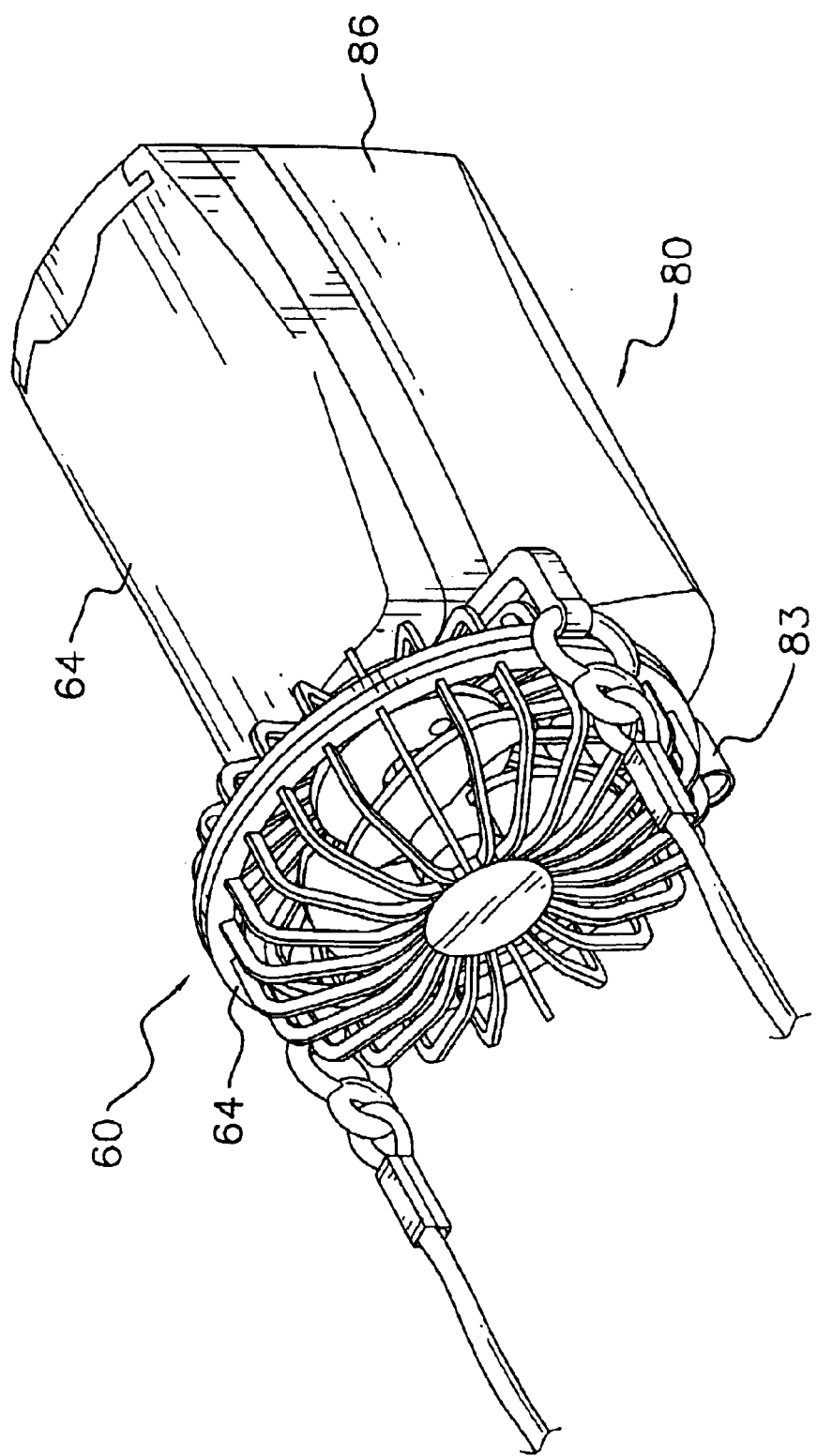
FIG. 4 is a perspective view of a conventional portable combination fan and mister in accordance with the prior art.
Figure 5:
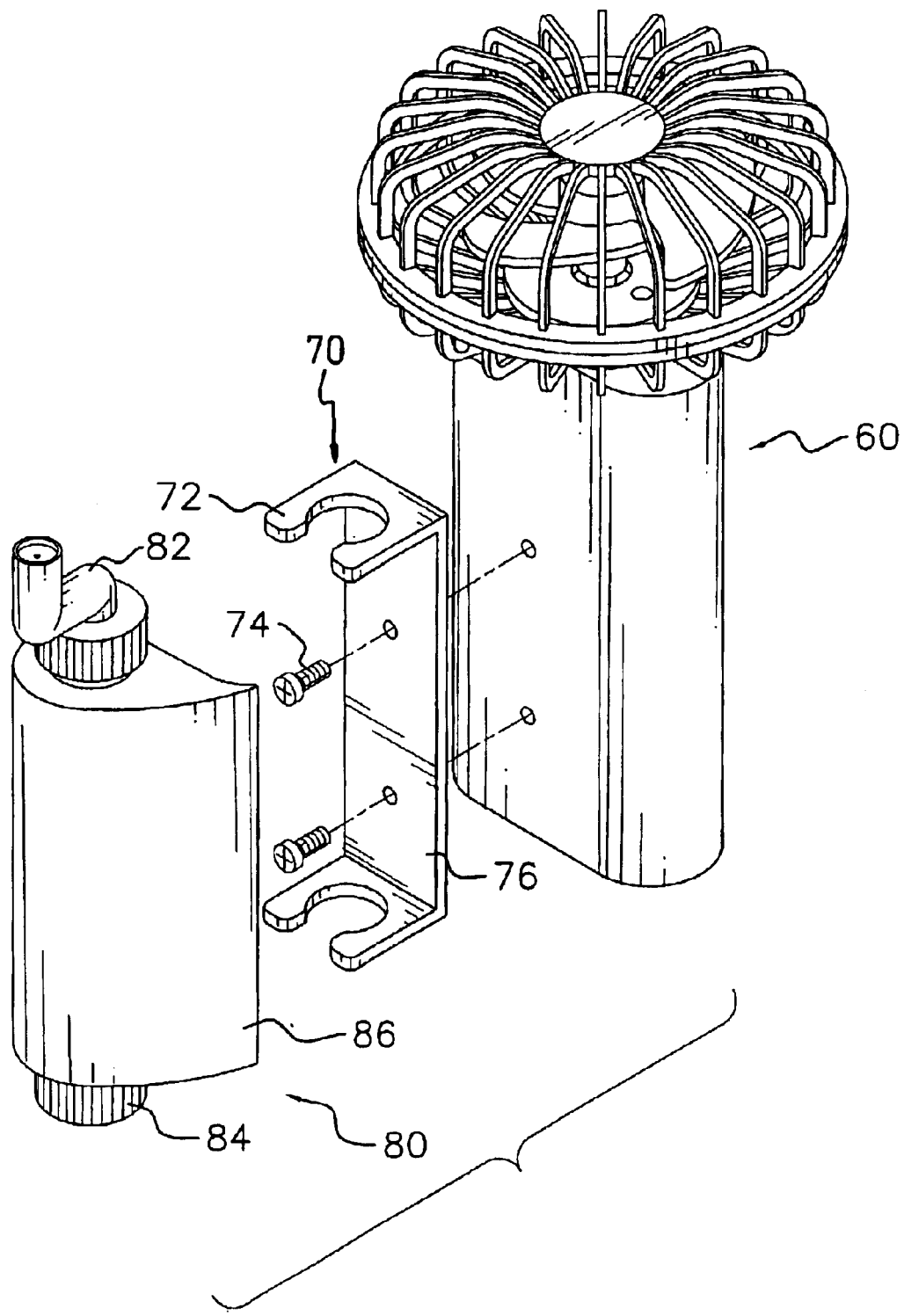
FIG. 5 is an exploded perspective view of the portable combination fan and mister in FIG. 4.
Figure 6:
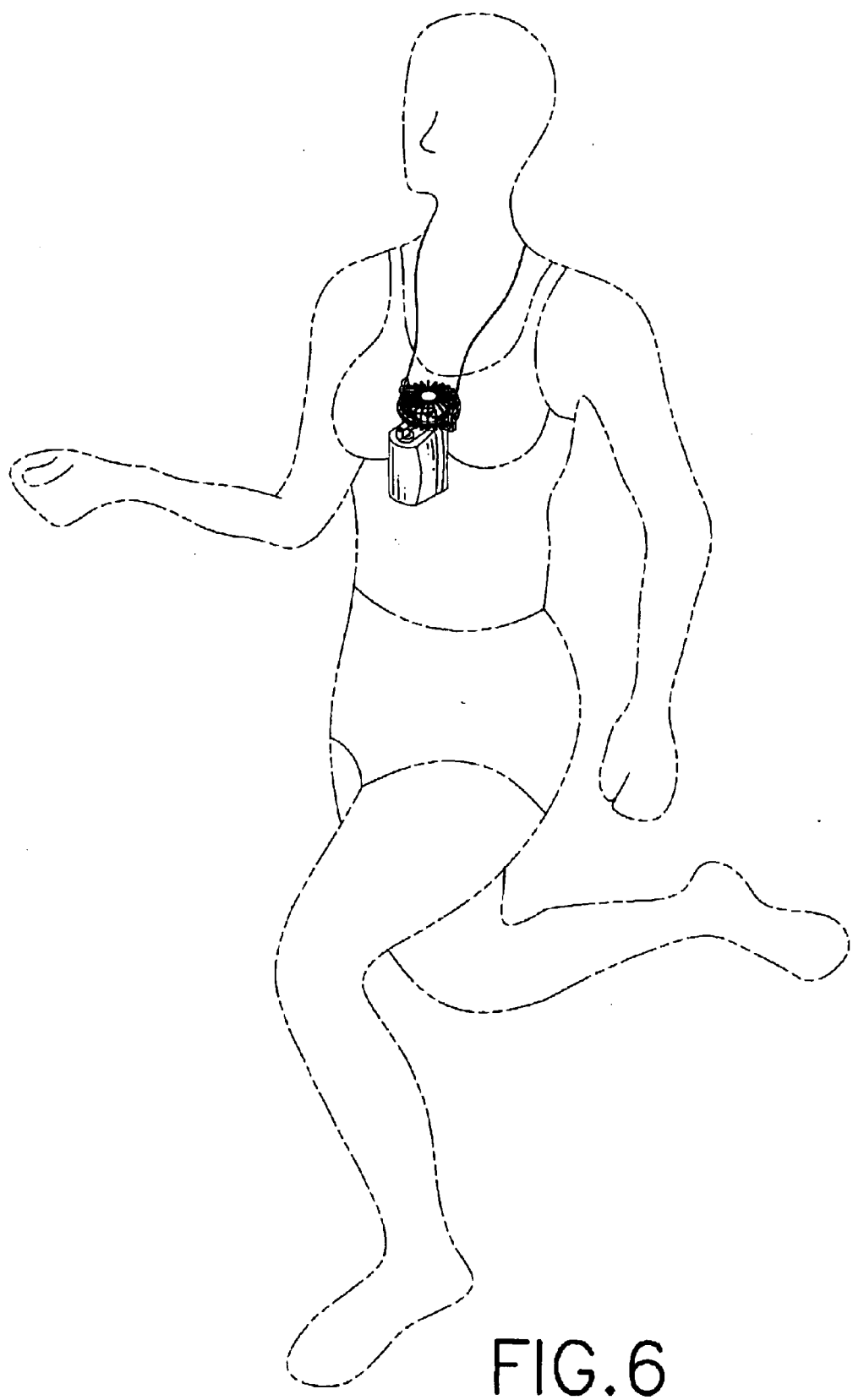
FIG. 6 is an operational perspective view of the portable combination fan and mister in FIG. 4 in use by an athlete.

With further reference to FIG. 3, the hook (540) on the hook bracket (54) is securely mounted to the strongback (526) on the U-shaped bracket (52) when the fan assembly (10) is attached to the mister (30). At the same time, the latch (524) on the lock (522) extends into the latch recess (544) in the hook bracket (54) and keeps the fan assembly (10) and the mister (30) from moving relative to each other.

To separate the fan (10) from the mister (30), the lock (522) is pulled away from the bottom of the fan assembly (10) housing (12) to release the latch (524) from the latch recess (544) so the hook (540) can be disengaged from the strongback (526). The lock (522) allows the fan (10) to be separated from the mister (30) quickly and conveniently.

Although the invention has been explained in relation to its preferred embodiment, many other possible modifications and variations can be made without departing from the spirit and scope of the invention as hereinafter claimed.

What is claimed is:

1. A connector for a portable combination fan and mister having a fan assembly with a housing having a bottom surface, a hook-bracket recess formed in the bottom surface and multiple threaded holes formed in housing in the hook-bracket recess and a mister with a reservoir having an abutting surface, a nozzle opening with a protruding neck and a fill opening with a protruding neck; the connector comprising:

a U-shaped bracket comprising a longitudinal strip, two resilient clamps, a lock and a strongback, wherein
  the longitudinal strip has a forward end, a rear end, a longitudinal slot and a notch, wherein
    the longitudinal slot is formed near the forward end; and
    the notch is formed in the rear end;
  the resilient clamps are formed respectively on and extend perpendicular from opposite ends of the longitudinal strip and are adapted to be attached to the mister by pressing the resilient clamps respectively onto the protruding necks extending from the nozzle opening and the fill opening;
  the lock is formed in the notch, extends past the rear end of the longitudinal strip and has a triangular latch protruded transversely away from the lock; and
  the strongback is defined over half of the longitudinal slot in the longitudinal strip toward the rear end;

a hook bracket comprising a mounting strip, a hook, multiple through holes and a latch recess, wherein
  the mounting strip adapted to correspond to the hook-bracket recess in the fan housing and has a front end and a rear end;
  the through holes are formed through the mounting strip and adapted to correspond to the threaded holes in the hook-bracket recess on the bottom of the fan housing;
  the hook is L-shaped, formed near the front end of the hook bracket, extends toward the rear end of the hook bracket, is slidably mounted in the longitudinal slot in the longitudinal strip of the U-shaped bracket and engages the strongback of the U-shaped bracket; and
  the latch recess is formed in the rear end of the mounting strip and receives the latch on the lock when the strongback is fully seated in the hook; and multiple screws respectively extend through the through holes and are adapted to screw into the threaded holes in the hook-bracket recess on the bottom of the housing of the fan.

* * * * *